US007896241B2

United States Patent
Bychkov et al.

(10) Patent No.: US 7,896,241 B2
(45) Date of Patent: Mar. 1, 2011

(54) AUTOMATED CARD CUSTOMIZATION MACHINE

(75) Inventors: Eyal Bychkov, Hod Hasharon (IL); Yohan Cohen, Hod Hasharon (IL); Itzhak Pomerantz, Kefar Saba (IL); Avraham Meir, Rishon Lezion (IL)

(73) Assignee: Sandisk IL Ltd., Kfar Saba (IL)

( * ) Notice: Subject to any disclaimer, the term of this patent is extended or adjusted under 35 U.S.C. 154(b) by 0 days.

(21) Appl. No.: 11/618,939

(22) Filed: Jan. 2, 2007

(65) Prior Publication Data

US 2007/0152039 A1 Jul. 5, 2007

Related U.S. Application Data

(60) Provisional application No. 60/755,536, filed on Jan. 3, 2006.

(51) Int. Cl.
*G06K 7/08* (2006.01)
(52) U.S. Cl. .............................. 235/381; 235/380; 705/26
(58) Field of Classification Search .................. 235/380, 235/381; 705/26
See application file for complete search history.

(56) References Cited

U.S. PATENT DOCUMENTS

| 5,235,519 | A | | 8/1993 | Miura | |
|---|---|---|---|---|---|
| 5,372,416 | A | * | 12/1994 | Shapley et al. | 312/138.1 |
| 5,465,082 | A | * | 11/1995 | Chaco | 340/825.49 |
| 5,753,897 | A | * | 5/1998 | Kasper | 235/380 |
| 5,837,991 | A | * | 11/1998 | LaManna et al. | 235/475 |
| 5,949,046 | A | * | 9/1999 | Kenneth et al. | 235/380 |
| 6,169,975 | B1 | | 1/2001 | White et al. | |
| 6,227,972 | B1 | * | 5/2001 | Walker et al. | 463/25 |
| 6,298,336 | B1 | | 10/2001 | Davis et al. | |
| 7,218,991 | B2 | * | 5/2007 | Walker et al. | 700/234 |
| 7,676,401 | B2 | * | 3/2010 | Sawada et al. | 705/26 |
| 2007/0192590 | A1 | | 8/2007 | Pomerantz et al. | |

* cited by examiner

*Primary Examiner* — Michael G Lee
*Assistant Examiner* — Rafferty Kelly
(74) *Attorney, Agent, or Firm* — Toler Law Group

(57) ABSTRACT

A card vending machine includes a storage area, wherein each of a plurality of memory cards to be issued by a respective one of at least two different issuers are stored. A security mechanism conditions access of each issuer to only a respective portion of the storage area upon authorization of this issuer. An interface mechanism is operated by a user to define a purchasing transaction and a controller is operative, in accordance with the interface mechanism, to customize a memory card at least in part according to the purchasing transaction.

60 Claims, 2 Drawing Sheets

AUTOMATED CARD CUSTOMIZATION MACHINE

CROSS-REFERENCE TO RELATED APPLICATIONS

This patent application claims the benefit of U.S. Provisional Patent Application No. 60/755,536 filed Jan. 3, 2006.

FIELD OF THE INVENTION

The present invention relates generally to the field of card customization.

BACKGROUND OF THE INVENTION

Memory cards having a digital circuit and a read-write memory are well known in the art of digital storage devices, and are used for many applications such as driver licenses, credit cards, employee badges, membership cards etc.

Some of these cards, such as smart cards, are used as a bearer of identification or financial transactions providing their bearer security services, such as access to information or to money. These cards have to be secured against fraud, theft and loss. Therefore, organizations that issue these cards take several measures of security to prevent cards from reaching wrong hands.

Automatic vending machines for automatically vending different types of products that were once retailed only over the counter are very well known in the art of commerce. Typical examples are vending machines that deliver cash money, plane tickets, cellular phones, telephone cards, personal photographs etc.

Vending machines that require access to secure content of a user for completing the operation, such as ATM machines, must be secure, fortified and monitored, making such vending machines very heavy and expensive.

Because of the alienation, competition and suspicion between the different issuers of secure memory cards of all sorts, issuers of different digital storage cards are reluctant to cooperate when it comes to sharing a common vending machine for digital storage cards A Secure memory card, such as a SIM (Subscriber Identification Mobile) card is a smart-card-type device storing secured data (e.g. private key for identification of a user). ATM machines are an exception as different banks share the same vending machine, but this is a case where the delivered product is a uniform and non-customized product, such as bills of money, and where there is no competition between the vendors—as each user consumes cash from his/her own bank account.

There is thus a widely recognized need for, and it would be highly advantageous to have a solution by which several card issuers could serve their customers with enhanced and more economic services, which are not provided by solutions known in the art.

SUMMARY OF THE INVENTION

Accordingly, it is a principal object of the present invention to introduce a card vending machine that issues digital memory cards of several types in compliance with the specific requirements of each of a plurality of different and unrelated issuers.

By "issuers" it refers herein in the broad sense to any human agent authorized to represent a specific commercial organization.

A card vending machine is defined here as a machine operative to customize and retail digital memory cards Accordingly, "vending" refers to the retail sale and/or customization of digital memory cards, as performed, for example, by the card vending machine of the present invention.

The term "customize" is referred herein to mean at least one of programming at least 200 bytes of user-dependent data and/or changing (e.g. printing, shaping) the visual appearance of the digital memory card, operations of which are applied by the card vending machine of the present invention, to modify the visual appearance and data storage of a digital memory card in accordance with the user's preferences and the issuer's policy In accordance with a preferred embodiment, there is provided a card vending machine that includes: (a) a storage area, wherein each of a plurality of memory cards to be issued by a respective one of at least two different issuers are stored Preferably, the card vending machine also includes a security mechanism that conditions access of each of the different issuers to only a respective portion of the storage area upon authorization of the issuers More preferably, the security mechanism includes compartments, within the storage area, each compartment having a corresponding locking mechanism that provides access to only an authorized issuer.

Preferably, the plurality of memory cards includes secure memory cards

Preferably, the card vending machine also includes an interface mechanism that is operated by a user to define a purchasing transaction; and a controller that is operative, in accordance with the interface mechanism, to customize a memory card at least in part according to the purchasing transaction Optionally, the memory card is one of the plurality of memory cards. Alternatively, the memory card is a personal memory card that is fed to the card vending machine by the user. More alternatively, the card vending machine also includes a card slot for inputting the personal memory card.

More preferably, the controller is operative to customize the memory card in accordance with a value of at least one feature, such as digital content, physical contour, graphical decoration, means of payment, etc, Also more preferably, the card vending machine includes an authentication mechanism for authentication of the user in accordance with requirements of a respective issuer of the memory card. Most preferably, the controller is operative to customize the memory card conditional on the authentication of the user.

The authentication mechanism may include a biometric identifier reader, a voice recognition unit (such as a microphone), a facial recognition unit (such as a camera), a wireless communication mechanism, and/or any other authorization means known in the art.

The interface mechanism may include a keypad, a touch screen, a USB connector, a scanner, etc.

Also more preferably, the card vending machine may include a contour shape editor unit that is responsive to the controller to customize the memory card, and/or a graphical editor unit that is responsive to the controller to customize the memory card, and/or a programming unit that is responsive to the controller to program the memory card with digital content. Most preferably, the programming unit is operative to store at least 200 bytes of data (including user-dependent data) in the memory card. Also more preferably, the card vending machine includes a display for displaying a pre-view of the customized memory card.

In accordance with a preferred embodiment, there is further provided a vending method that includes the steps of: (a)

storing, in a common storage area, a plurality of memory cards; and (b) issuing each of the plurality of memory cards by a respective one of at least two different issuers.

Preferably, the plurality of memory cards includes at least one secure memory card.

Preferably, the vending method also include the steps of receiving a respective value of each of at least one parameter that defines a purchasing transaction of a user; and customizing one of the memory cards, at least in part, according to at least one of these values. More preferably, the customizing step is effected in accordance with a value of at least one feature, such as digital content, physical contour, graphical decoration, means of payment, etc. Also more preferably, the customizing includes storing at least 200 bytes of data (including data-dependent data) in the memory card.

More preferably, the vending method also includes the step of previously to the customizing, authenticating a user in accordance with requirements of the respective one issuer. Most preferably, the customization of this memory card is conditional on the authentication of the user The authentication may be effected by any authentication means known in the art, such as by reading biometric identification, by voice recognition, by facial recognition, by wireless communication, etc.

More preferably, the vending method also includes downloading digital content from a remote device in accordance with at least one of these values. Also more preferably, the vending method includes displaying a pre-view of the customized memory card. Also more preferably, the vending method includes allowing access of each the different issuers to only a respective portion of the common storage area conditional on authorization of this issuer. Most preferably, the step of allowing access includes separately storing memory cards of each issuer in compartments, each compartment having a corresponding locking mechanism that provides access to only an authorized issuer.

More preferably, the memory card is a personal memory card that is fed by the user. Most preferably, the vending method also includes updating the personal memory card.

In accordance with a preferred embodiment, there is further provided a card vending machine that includes: (a) an interface mechanism that is operated by a user to define a purchasing transaction; and (b) a controller that is operative, in accordance with the interface mechanism, to customize a memory card at least in part according to the purchasing transaction.

In accordance with a preferred embodiment, there is further provided a method of vending of memory cards by a card vending machine that includes the steps of: (a) receiving, by the card vending machine, a respective value of each of at least one parameter that defines a purchasing transaction of a user; and (b) customizing, by the card vending machine, one of the memory cards, at least in part, according to at least one of these values.

In accordance with a preferred embodiment, there is further provided a card vending machine that includes: (a) an interface mechanism that is operated by a user to define a purchasing transaction; and (b) a controller that is operative, in accordance with the interface mechanism, to customize a memory card at least in part according to the purchasing transaction by modifying at least 200 bytes of user-dependant data.

In accordance with a preferred embodiment, there is further provided a method of vending of memory cards by a card vending machine that includes the steps of: (a) receiving, by the card vending machine, a respective value of each of at least one parameter that defines a purchasing transaction of a user; and (b) customizing, by the card vending machine, one of the memory cards, at least in part, according to at least one of these values by modifying at least 200 bytes of user-dependant data.

In accordance with a preferred embodiment, there is further provided a card vending machine that includes: (a) an interface mechanism that is operated by a user to define a purchasing transaction; and (b) a controller that is operative, in accordance with the interface mechanism, to customize a visual appearance of a memory card at least in part according to the purchasing transaction.

In accordance with a preferred embodiment, there is further provided a method of vending of memory cards by a card vending machine that includes the steps of: (a) receiving, by the card vending machine, a respective value of each of at least one parameter that defines a purchasing transaction of a user; and (b) customizing, by the card vending machine, a visual appearance of one of the memory cards, at least in part, according to at least one of these values.

In accordance with a preferred embodiment, there is further provided a card vending machine that includes: (a) a connecting mechanism for receiving digital content from an external storage unit; and (b) a controller that is operative to store, in a memory card, at least a portion of the digital content.

Preferably, the controller is further operative to modify the digital content

Preferably, the connecting mechanism includes a USB connector.

In accordance with a preferred embodiment, there is further provided a method of vending of memory cards by a card vending machine that includes the steps of: (a) receiving, by the card vending machine, digital content from an external storage unit; and (b) storing, in a memory card, at least a portion of the digital content. Preferably, the method also includes modifying, by the card vending machine, the digital content.

Additional features and advantages of the invention will become apparent from the following drawings and description.

BRIEF DESCRIPTION OF THE DRAWINGS

For a better understanding of the invention with regard to the embodiments thereof reference is made to the accompanying drawing, in which like numerals designate corresponding sections or elements throughout, and in which.

DETAILED DESCRIPTION OF THE PREFERRED EMBODIMENTS

The present invention is a card vending machine that issues digital memory cards of several types in compliance with the specific requirements of each of a plurality of different and unrelated issuers.

The digital memory cards are printed, shaped and programmed by the card vending machine, in accordance with the user's preferences and the issuer's policy. By way of example, the user's preferences may determine the way of which the digital memory card is to be produced in accordance with a plurality of aspects, such as the digital content to be downloaded (e.g. digital book, video films, audio songs, and software applications), the physical contour, the graphical decoration, the means of payment, etc.

Typically, the digital memory cards provided by the card vending machine of the present invention include non-secure digital memory cards (such as a digital book) and secure digital memory cards (such as pre-paid cards, membership cards, etc.). Secure cards will be provided to a user upon authentication of the user, in accordance with the requirements defined by the issuer of such cards.

The digital memory cards stored in the card vending machine of the present invention can also be empty digital memory cards (that bear no content) or digital memory cards having DRM protected content.

In accordance with one embodiment, a user can use the card vending machine to purchase a new digital memory card. As an example, the user can request to purchase a new digital memory card that includes specific songs stored in a digital format and that is illustrated with a personal graphical dedication.

In accordance with one embodiment, a user can use the card vending machine to update his/her old digital memory card, for example for storing new digital content, for loading more money, etc.

Typically, the digital memory cards stored in the card vending machine are of a standard size, such as the ISO 7810 standard or the ISO 7816 standard The cards can include a flat USB connector, such as the Double sided USB connector of Wallet Flash™, available from Walletex Ltd. Rishon-Lezion, Israel, for connecting the digital memory card to a host computer.

Figure 1:
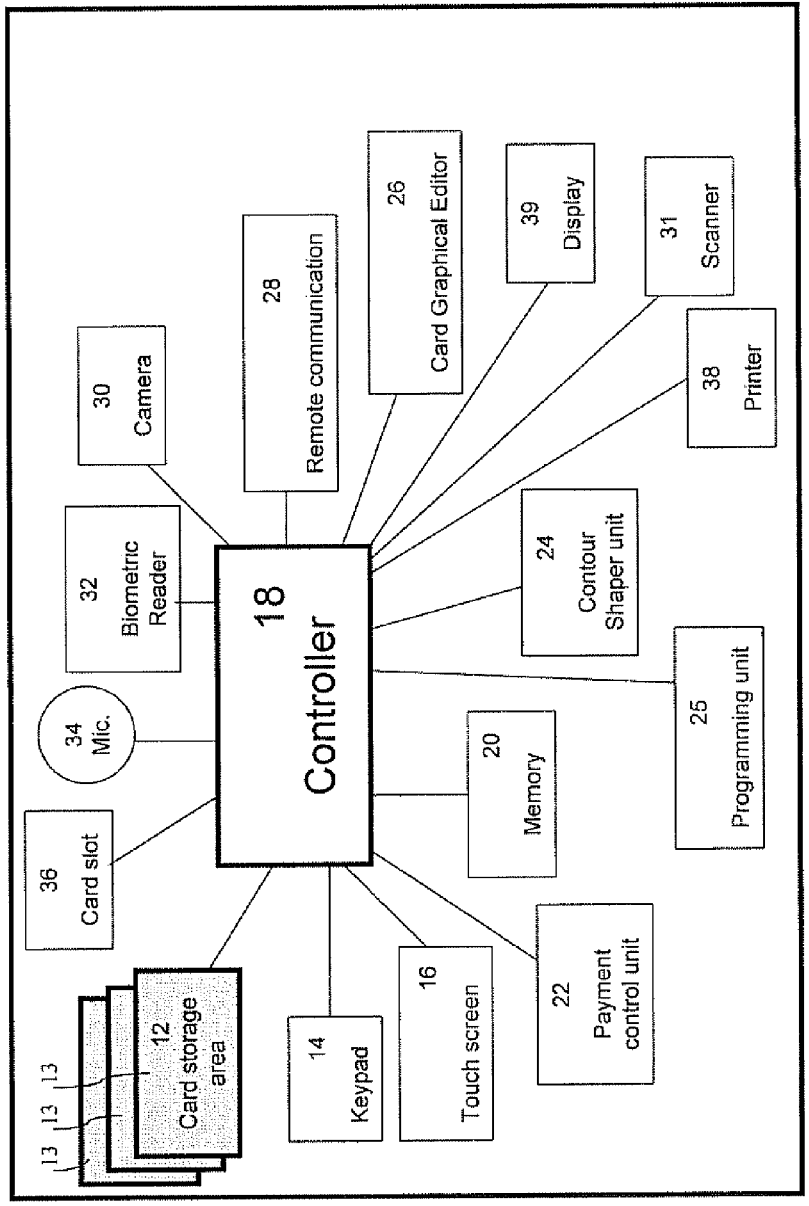
Referring to FIG. 1, there is shown an exemplifying, not limiting, high level schematic block diagram of a card vending device of the present invention; and Referring to FIG. 2, there is shown a simplified flow chart example of a method of the present invention for operating the card vending machine

Referring now to FIG. 1, there is shown a block diagram of a card vending machine 10 of the present invention The digital memory cards are stored in special decks, one deck per issuer, in a card storage area 12. The digital memory cards can be fed into the machine either by the owner of the card vending machine, or alternatively by an authorized agent of each issuer.

As the card vending machine of the present invention is designed to serve several issuers, digital memory cards of one issuer are preferably stacked separately from digital memory cards of another issuer (e.g. in separate compartments 13) and access of issuers (or authorized agents thereof) to different parts of card storage area 12 is conditional upon authorization of the corresponding issuer. Preventing unauthorized people physical access to the storage area where memory cards of other issuers are stored can be achieved, for example, by stacking the memory cards in separate compartments 13. Each compartment has a respective lock to assure that only the authorized issuer can access the storage area of where his digital memory cards are stored to replace or extract the digital memory cards.

Optionally, a personal memory card can be fed (via a card slot 36) by its user to be customized by the card vending machine 10. This allows a user to insert his/her old digital memory card and load the digital memory card with more money, download new digital content, etc.

The digital memory card delivered by the machine to a user can be either a non-secure digital memory card or a secure digital memory card.

A secure card is provided to a user upon authentication of the user (using remote communication unit 28) by a remote source such as a human operator, in accordance with the specific requirements made by the different organizations for issuing their digital memory cards. Authentication of a user can be achieved, for example, by providing voice recognition means, such as a microphone 34, and/or providing facial recognition means, such as a camera 30, and/or implementing a scanner 31 to enable documentation presentation. The scanner further enables a user to scan his/her own graphical illustration (e.g. photo) and request that this graphical illustration be printed on the digital memory card that is to-be purchased from the card vending machine. Authentication can be further achieved using a biometric identifier reader 32 implemented in accordance with the biometric identification techniques (such as fingerprint recognition) well known in the art of information security See for example, the biometric system techniques and products, such as the 3dMDface™ System, available from 3dMD Ltd., Atlanta, Ga., that provide face recognition, descriptions of which are available on request from the American Biometric Consortium, all of which are incorporated by reference for all purposes as if fully set forth herein Card vending machine 10 also includes, in a memory 20, a Clipart library storing graphical illustrations that are available to the user for incorporation upon the printed face of the digital memory cards, and a digital content storage unit storing digital content, such as digital books, video films, audio songs, software applications, and other content, that is available for the user to download into the digital memory card. Note that the digital content is preferably stored in the digital content storage unit, in accordance with DRM (Digital Rights Management) methods providing copyright protection of the digital content and other information security methods known in the art.

A Controller 18 is operative to manage the overall customization and vending process of the card vending machine 10 in accordance with the requirements of the issuers and the preferences of the user that are received as input via a keypad 14 or a touch screen 16 for example. By way of example, the user's preferences may determine the way of which the digital memory card is to be produced in accordance with a plurality of aspects, such as the digital content to be downloaded (e.g. digital book, video films, audio songs, and software applications), the physical contour of the digital memory card, the graphical decoration (such as a personal printed decoration) of the digital memory card, the means of payment, etc.

The operational units include a Contour Shaper unit 24 for shaping the digital memory card, a Card Graphical Editor 26 for printing graphical decorations upon the digital memory card, and a Card Programming unit 25 for programming the digital memory card with requested digital content, all of which are applied in accordance with the preferences defined or selected by the user. Card Programming unit 25 is operative to store at least 200 bytes of user-dependent data in the digital memory card.

A display 39 is optionally provided for displaying the user a pre-view of the digital memory card before it is issued to the user A memory 20 storing graphical illustrations and digital content is also provided A user may choose to program and design his/her digital memory card according to digital content and graphical illustrations stored in memory 20, Alternatively, the digital content and graphical illustrations, which are required to be loaded into the digital memory card, may be downloaded (using USB connector 27) from the user's portable storage device, such as a Disk-On-Key™, available from msystems Ltd., Kefar Sava, Israel. A remote communication unit 28 is optionally provided for downloading the digital content and graphical illustrations from a remote storage device using wireless communication.

A payment unit 22, as found in many vending machines and parking machines known in the art, is operative to perform a purchasing transaction, typically by billing the user for the digital memory card/s and for the digital content that he/she purchased. A printer 38 is optionally implemented to provide the user with a receipt and other printed information that is related to the purchasing transaction The payment unit 22 and printer 38 both operate in response to instructions received from Controller 18.

Figure 2:
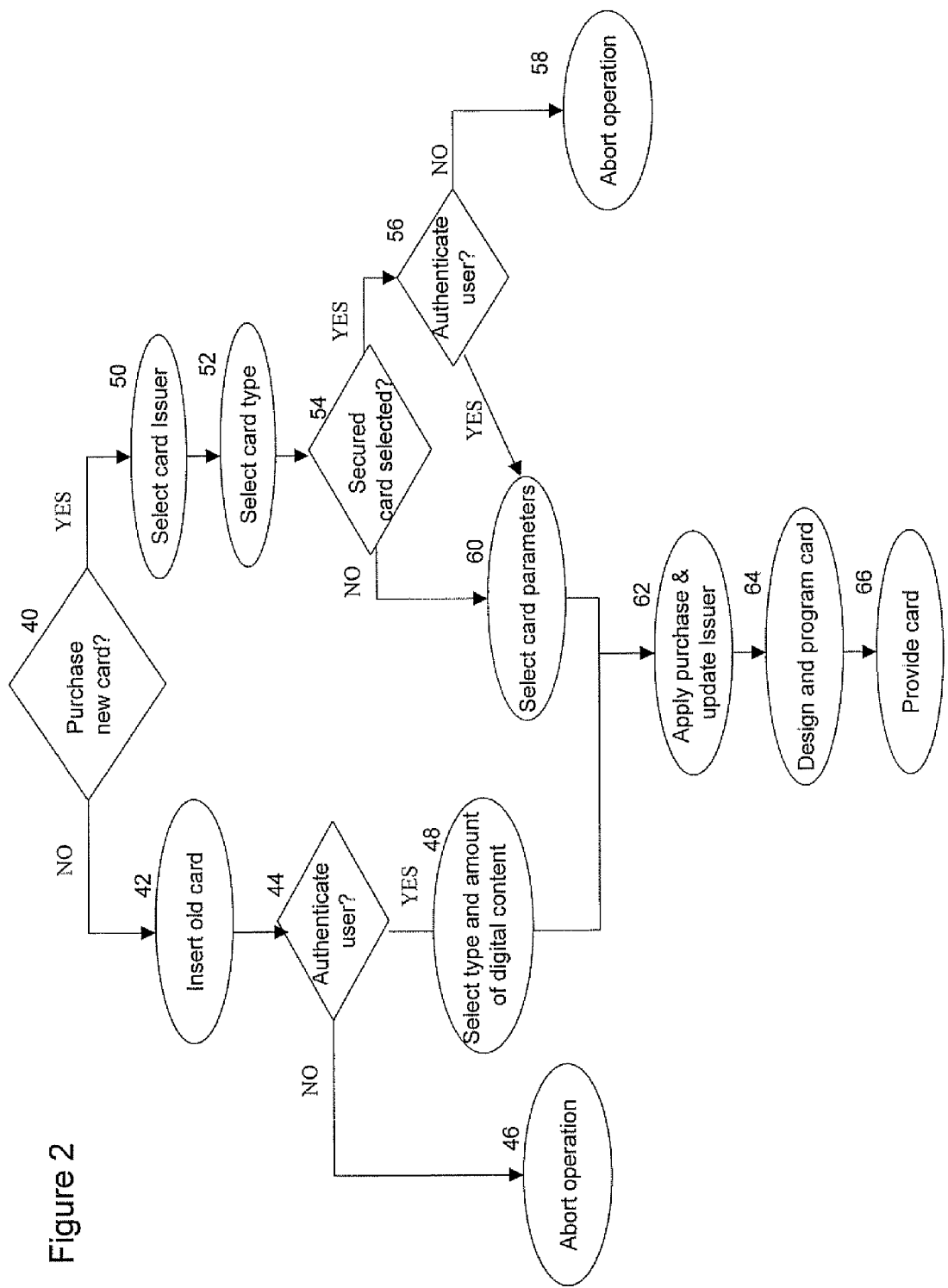

Referring to FIG. 2, there is shown a flowchart of a method of the present invention for operating the card vending machine.

At the initial step 40, the user is requested to select if he/she wishes to purchase a new digital memory card or to update an existing digital memory card.

If the user wishes to update his/her existing digital memory card, the user inserts his/her old digital memory card in card slot 36 (step 42). At the next step 44, it is determined whether the user is identified and authenticated by the card vending machine in accordance with the different authentication means known in the art, as presented above. If a unique issuer can not be identified as a valid issuer to serve this user, then operation is aborted (step 46). However, in case the user is identified and authorized by the card vending machine, step 48, then the user may select the type of transaction he/her wishes to perform (for example, downloading of new digital content, loading more money) for this digital memory card. The method then proceeds to step 60.

If the user wishes to purchase a new digital memory card, an issuer is selected by the user (step 50). A menu of operations specified by the selected issuer is then presented. At the next step 52, the user selects from the menu of operations the operations he wants to perform and the type of digital memory card he/she wishes to purchase.

At the next step 54, it is determined whether the selected operation involves a secure memory card. In the negative case, the method proceeds directly to step 60. However in the affirmative case, step 56, an authentication process is applied in accordance with the requirements defined by this issuer to authenticate the user. If the user is verified as authentic, the method then proceeds to step 60. If the user is not verified as authentic, the operation is aborted (step 58). The authentication process is applied in accordance with the different authentication means known in the art, as presented above.

At step 60, a set of parameters (such as physical shape, digital content, graphical illustrations) are defined by the user to determine the way in which the digital memory card is to be produced and the type and amount of digital content to be programmed into the digital memory card by the card vending machine. The digital content and graphical illustrations selected by the user can be downloaded either from a local memory of the card vending machine or from a remote storage device (such as a remote library of digital content owned by a publisher) physically separated and in remote communication with the card vending machine. Optionally, the user can select to design and program his/her digital memory card with digital content and graphical illustrations downloaded from his/her personal portable storage device.

At step 62, the purchasing transaction is applied by the user. At this step the issuer's database is updated with this purchasing transaction.

At step 64, the digital memory card is printed, shaped and programmed (using Contour Shape unit 24 and Card Graphical Editor 26) according to the set of parameters previously selected by the user at step 48 or at step 60.

At the final step 66, the digital memory card is provided to the user. This step may optionally include a process Of quality control, by which the content of the digital memory card is being read or sampled and evaluated by the card vending machine Having described the system of the present invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A card vending machine comprising:
   card storage to store memory cards, the card storage comprising:
      a first storage compartment storing a first memory card that is associated with a first issuer;
      a second storage compartment storing a second memory card that is associated with a second issuer that is distinct from the first issuer;
      wherein the first issuer is permitted to access the first storage compartment and the first issuer is excluded from access to the second storage compartment; and
      wherein the second issuer is permitted to access the second storage compartment and the second issuer is excluded from access to the first storage compartment;
   an interface that is operable to
      receive at least one of a user-selected value of a first parameter and a user-selected value of a second parameter; and
   a controller operative to manage customization of at least one of the first memory card and the second memory card;
   an authentication mechanism to authenticate a user and to grant permission to the user to customize one of the first memory card and the second memory card in response to authenticating the user; and
   a card programming unit operative to:
      receive the first memory card from the card storage and store first data in the first memory card to produce a customized first memory card when the user is granted permission to customize the first memory card and in response to receipt at the interface of the user-selected value of the first parameter; and
      receive the second memory card from the card storage and store second data in the second memory card to produce a customized second memory card when the user is granted permission to customize the second memory card and in response to receipt at the interface of the user-selected value of the second parameter.

2. The card vending machine of claim 1, wherein the card vending machine is operative to customize the first memory card or the second memory card in accordance with a value of at least one of physical contour, graphical decoration, and means of payment.

3. The card vending machine of claim 1, wherein the authentication mechanism is to authenticate the user in accordance with requirements of at least one of the first issuer and the second issuer.

4. The card vending machine of claim 3, wherein the controller is operative to permit the customization conditional on authenticating the user.

5. The card vending machine of claim 3, wherein the authentication mechanism includes a biometric identifier reader.

6. The card vending machine of claim 3, wherein the authentication mechanism includes a voice recognition unit.

7. The card vending machine of claim 3, wherein the authentication mechanism includes a microphone.

8. The card vending machine of claim 3, wherein the authentication mechanism includes a facial recognition unit.

9. The card vending machine of claim 8, wherein the facial recognition unit includes a camera.

10. The card vending machine of claim 3, wherein the authentication mechanism includes a wireless communication mechanism.

11. The card vending machine of claim 1, wherein the interface includes a keypad.

12. The card vending machine of claim 1, wherein the interface includes a touch screen.

13. The card vending machine of claim 1, wherein the interface includes a universal serial bus (USB) connector.

14. The card vending machine of claim 1, wherein the interface includes a scanner.

15. The card vending machine of claim 1, further comprising a contour shape editor unit that is responsive to the controller to customize one of the first memory card and the second memory card.

16. The card vending machine of claim 1, further comprising a graphical editor unit that is responsive to the controller to customize one of the first memory card and the second memory card.

17. The card vending machine of claim 1, wherein the card programming unit is operative to store at least 200 bytes of data in one of the first memory card and the second memory card.

18. The card vending machine of claim 1, further comprising a display to display a pre-view of one of the customized first memory card and the customized second memory card.

19. The card vending machine of claim 1, wherein the first data includes a quantitative measure of a first fungible asset.

20. The card vending machine of claim 1, wherein the first data includes digital content.

21. The card vending machine of claim 20, wherein the digital content includes a digital book.

22. The card vending machine of claim 20, wherein the digital content includes video content.

23. The card vending machine of claim 20, wherein the digital content includes audio content.

24. The card vending machine of claim 20, wherein the digital content includes a software application.

25. The card vending machine of claim 20, wherein the digital content is downloaded from a remote storage device prior to storing the first data in the first memory card.

26. The card vending machine of claim 1, wherein the second data is downloaded from a local memory of the card vending machine to the second memory card.

27. The card vending machine of claim 1, wherein the authenticating is effected by a biometric authentication.

28. The card vending machine of claim 1, wherein the apparatus is further operative to apply a purchasing transaction.

29. The card vending machine 28, wherein the apparatus is further operative to update a purchasing transaction database upon application of the purchasing transaction.

30. A method of vending, the method comprising:
    storing a first memory card associated with a first issuer in a first secure compartment of a vending apparatus and storing a second memory card associated with a second issuer in a second secure compartment of the vending apparatus, wherein the first issuer is excluded from accessing the second secure compartment and the second issuer is excluded from accessing the first secure compartment;
    receiving one of a user-selected value of a first parameter from a user and a user-selected value of a second parameter from the user;
    granting access to at least one of the first memory card and the second memory card in response to authentication of the user;
    storing first data associated with the user-selected value of the first parameter in the first memory card via a card programming unit to form a customized first memory card when the user is granted access to the first memory card and in response to receipt of the user-selected value of the first parameter;
    storing second data associated with the user-selected value of the second parameter in the second memory card via the card programming unit to form a customized second memory card when the user is granted access to the second memory card and in response to receipt of the user-selected value of the second parameter; and
    providing one of the customized first memory card and the customized second memory card to the user.

31. The vending method of claim 30, wherein one of the first memory card and the second memory card is customized in accordance with a value of at least one of physical contour, graphical decoration, and means of payment.

32. The vending method of claim 30, wherein storing the first data includes storing at least 200 bytes of data in the first memory card and storing the second data includes storing at least 200 bytes of data in the second memory card.

33. The vending method of claim 30, wherein one of the first memory card and the second memory card is customized conditional on the authentication of the user.

34. The vending method of claim 30, wherein the authentication is effected by reading a biometric identification.

35. The vending method of claim 30, wherein the authentication is effected by voice recognition.

36. The vending method of claim 30, wherein the authentication is effected by facial recognition.

37. The vending method of claim 30, wherein the authentication is effected by wireless communication.

38. The vending machine of claim 30, wherein the user-selected value of the first parameter is received from a keypad.

39. The vending machine of claim 30, wherein the user-selected value of the first parameter is received from a touch-screen.

40. The vending machine of claim 30, wherein the user-selected value of the first parameter is received from a portable storage device.

41. The vending machine of claim 30, wherein the user-selected value of the first parameter is received from a scanner.

42. The vending method of claim 30, further comprising displaying a pre-view of one of the customized first memory card and the customized second memory card.

43. The method of claim 30, wherein the first data includes a quantitative measure of a first fungible asset.

44. The method of claim 30, wherein the first data includes digital content.

45. The method of claim 44, wherein the digital content includes a digital book.

46. The method of claim 44, wherein the digital content includes video content.

47. The method of claim 44, wherein the digital content includes audio content.

48. The method of claim 44, wherein the digital content includes a software application.

49. The method of claim 44, wherein the digital content is downloaded from a remote storage device prior to storing the first data in the first memory card.

50. The method of claim 44, wherein the digital content is downloaded from a local memory of the card vending machine to the first memory card.

51. The method of claim 30, further comprising receiving a user-selected value of a third parameter that is associated with one of a physical shape, digital content, and a graphical illustration.

52. The method of claim 51, further comprising, prior to providing one of the customized first memory card and the second customized second memory card to the user:
modifying the first memory card according to the user-selected value of the third parameter when the user is granted permission to customize the first memory card; and
modifying the second memory card according to the user-selected value of the third parameter when the user is granted permission to customize the second memory card.

53. The method of claim 30, further comprising prior to providing one of the customized first memory card and the second customized second memory card to the user, applying a purchasing transaction.

54. The method of claim 53, further comprising updating a purchasing transaction database upon applying the purchasing transaction.

55. An apparatus comprising:
card storage comprising:
a first storage compartment storing a first digital memory card that is associated with a first issuer;
a second storage compartment storing a second digital memory card that is associated with a second issuer, wherein the second issuer is distinct from the first issuer;
wherein the first issuer is permitted to access the first storage compartment and the first issuer is excluded from access to the second storage compartment, and wherein the second issuer is permitted to access the second storage compartment and the second issuer is excluded from access to the first storage compartment; and
wherein the first digital memory card is provided to a card programming unit in response to a first authentication of a user and the second digital memory card is provided to the card programming unit in response to a second authentication of the user;
a user interface operative to receive at least one of a user-selected value of a first parameter and a user-selected value of a second parameter, wherein the user-selected value of the first parameter identifies first data and the user-selected value of the second parameter identifies second data; and
the card programming unit, wherein the card programming unit is operative to:
store the first data in the first digital memory card to produce a customized first digital memory card when the first data is identified and when the first memory card is provided by the first storage compartment; and
store the second data in the second digital memory card to produce a customized second digital memory card when the second data is identified and when the second memory card is provided by the second storage compartment.

56. The apparatus of claim 55, wherein the apparatus is configured to output at least one of the customized first digital memory card and the customized second digital memory card.

57. The apparatus of claim 56, wherein the apparatus is configured to apply a purchasing transaction prior to outputting at least one of the customized first digital memory card and the customized second digital memory card.

58. The apparatus of claim 57, wherein the apparatus is configured to update a purchasing transaction database upon application of the purchasing transaction.

59. The apparatus of claim 55, wherein the user interface is operable to receive a user-selected value of a third parameter that is associated with one of a physical shape, digital content, and a graphical illustration.

60. The apparatus of claim 59, wherein the card programming unit is further operative to:
modify the first memory card according to the user-selected value of the third parameter when the first memory card is provided to the card programming unit; and
modify the second memory card according to the user-selected value of the third parameter when the second memory card is provided to the card programming unit.

* * * * *

UNITED STATES PATENT AND TRADEMARK OFFICE
CERTIFICATE OF CORRECTION

PATENT NO.         : 7,896,241 B2
APPLICATION NO.    : 11/618939
DATED              : March 1, 2011
INVENTOR(S)        : Eyal Bychkov et al.

Page 1 of 1

It is certified that error appears in the above-identified patent and that said Letters Patent is hereby corrected as shown below:

In the Claims section, Column 8, Claim 1, Line 26, "second parameter; and" should read --second parameter;--.

In the Claims section, Column 9, Claim 28, Line 51, "apparatus is further operative to apply a purchasing transaction" should read --controller is further operative to apply a purchasing transaction--.

In the Claims section, Column 9, Claim 29, Line 53, "The card vending machine 28, wherein the apparatus is" should read --The card vending machine of claim 28, wherein the controller is--.

Signed and Sealed this
Second Day of July, 2013

Teresa Stanek Rea
*Acting Director of the United States Patent and Trademark Office*